Jan. 3, 1950      E. L. HARLEY      2,493,628
OPTICAL MEANS FOR REGISTERING PRINTING SURFACES
Filed Dec. 15, 1945      2 Sheets-Sheet 1

INVENTOR.
Earle L. Harley
BY
attorneys

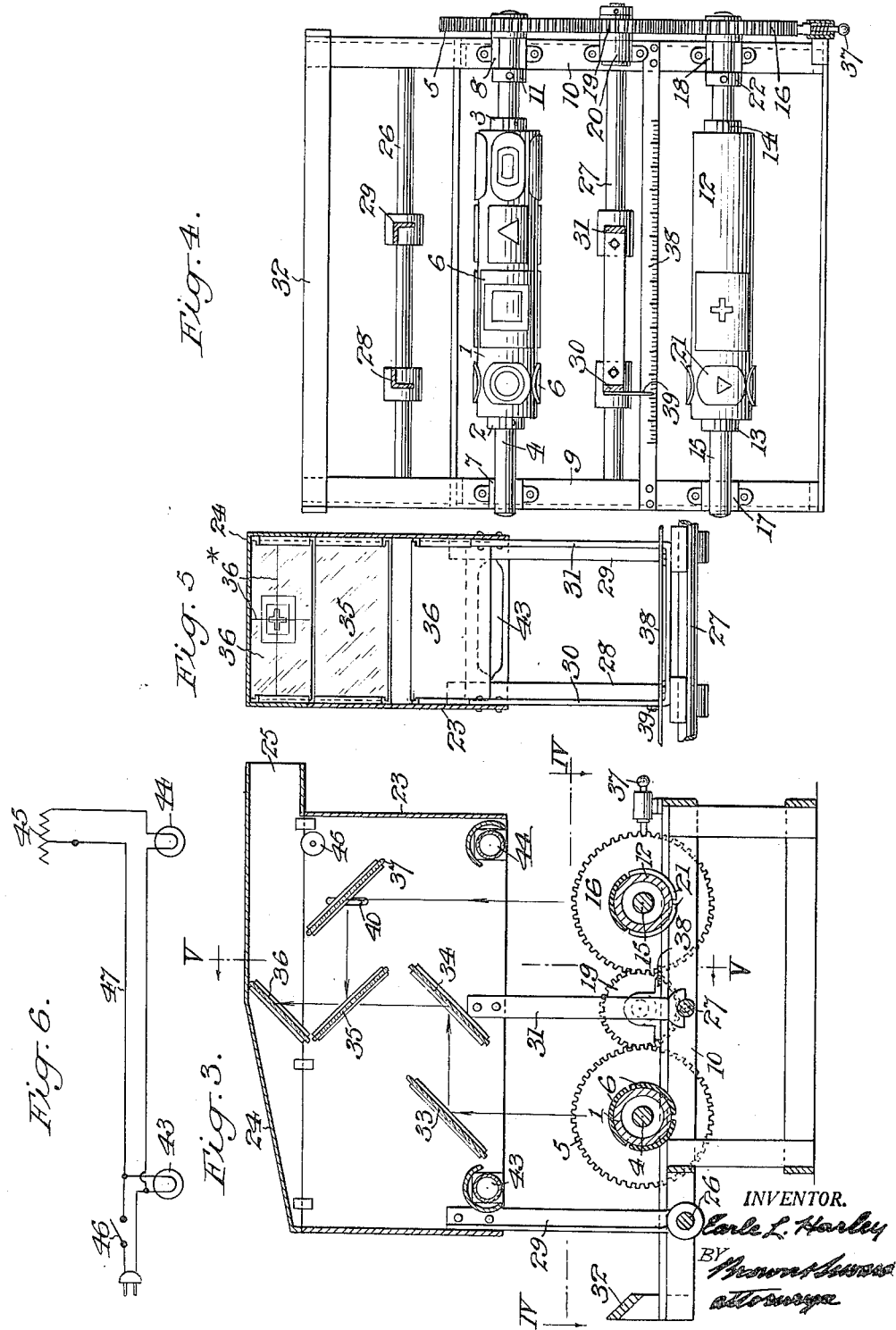

Patented Jan. 3, 1950

2,493,628

UNITED STATES PATENT OFFICE 2,493,628

OPTICAL MEANS FOR REGISTERING PRINTING SURFACES

Earle L. Harley, Brooklyn, N. Y.

Application December 15, 1945, Serial No. 635,284

7 Claims. (Cl. 88—14)

My invention is directed to a novel means for and method of registering the printing surfaces of one cylinder with coacting printing surfaces of another cylinder and includes means, as a suitable frame, for removably and rotatively mounting the two cylinders in parallelism and means, as a housing, for supporting mirrors arranged to reflect coacting printing surfaces in superimposed relationship to a predetermined point, as a window in the housing, for observation and correction of any misregister of said printing surfaces.

My invention also includes means for operatively connecting the two cylinders whereby they may be rotated in unison to bring into view in superimposed relationship different coacting printing surfaces in superimposed relationship to a predetermined point as a window in the housing for observation and correction of any misregister of said printing surfaces.

My invention also includes means for operatively connecting the two cylinders whereby they may be rotated in unison to bring into view in superimposed relationship different coacting printing surfaces arranged around the cylinders together with releasable means for locking the cylinders in their different rotative adjustments.

My invention also includes means mounting the mirror housing on the frame to be moved lengthwise of the cylinders for bringing into view in superimposed relationship different coacting printing surfaces arranged lengthwise of the cylinders.

My invention also includes pivotally mounting the mirror housing on the cylinder frame to permit the cylinders and their connecting means to be removed from and inserted into the frame when the housing is swung to its inoperative position.

My invention also includes novel means for ensuring the accurate positioning of the mirror housing lengthwise of the cylinders.

A practical embodiment of my invention is represented in the accompanying drawings, in which Fig. 1 represents a side view of the apparatus, the mirror housing being shown in full lines in its operative position and in dotted lines swung back to its inoperative position to permit the ready removal and insertion of the printing cylinders, their shafts an attached gears;

Fig. 3 represents a vertical section taken in the plane of the line III—III of Fig. 2;

Fig. 4 represents a horizontal section taken in the plane of the line IV—IV of Fig. 3.

Fig. 5 represents a detail vertical section taken in the plane of the line V—V of Fig. 3; and Fig. 6 represents a wiring diagram for the lamps which light up the coacting printing surfaces on the two cylinders.

Figure 2:
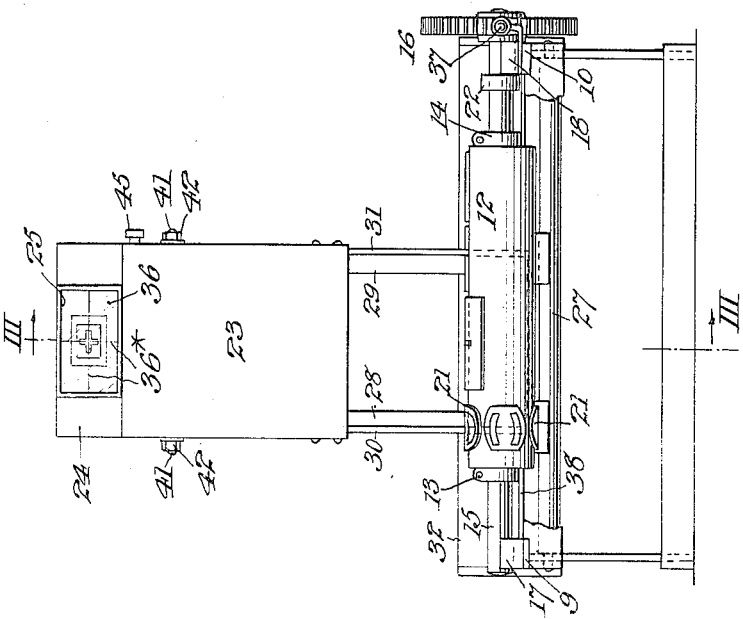
Fig. 2 represents a front view of the apparatus.
Figure 1:
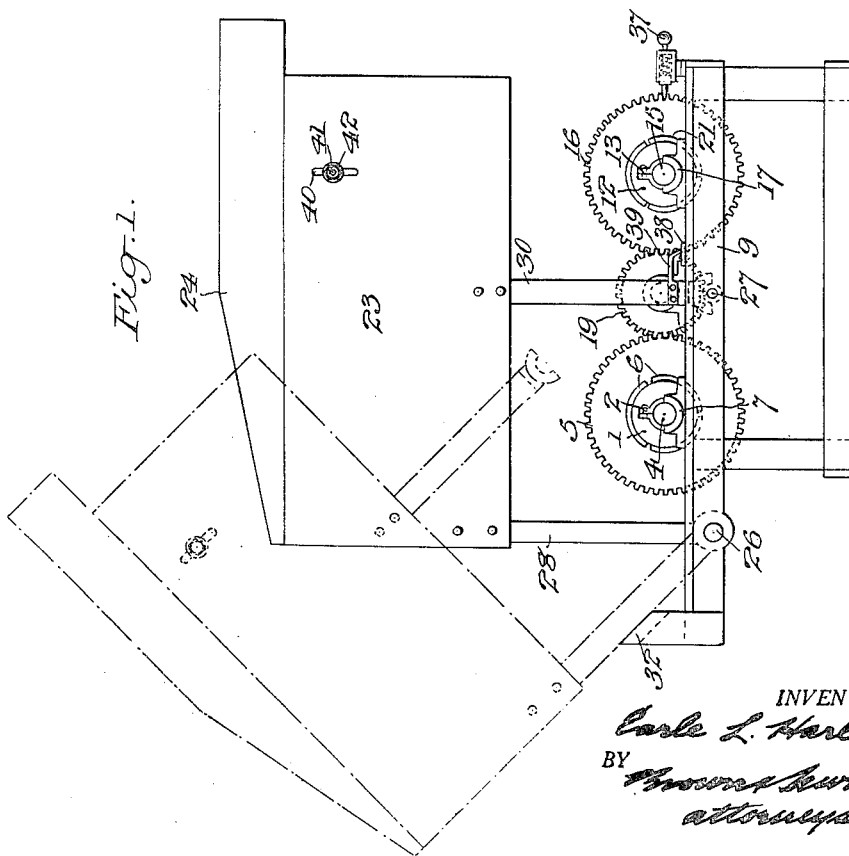

The master or key cylinder is denoted by 1, which cylinder is removably secured between end clamps 2 and 3 to the cylinder shaft 4, one end of which shaft is provided with a gear 5.

A full quota of printing plates 6 is shown as arranged both lengthwise of and circumferentially on the key cylinder 1, which cylinder is used for registering the printing plates on one or more additional cylinders according to the number of colors to be printed.

The ends of the cylinder shaft 4 are shown as rotatively and removably mounted in open bearings 7 and 8 on the horizontal side members 9 and 10 of the cylinder frame, the open bearings 7 and 8 permitting the ready removal of the key cylinder, its shaft and gear, when desired. A collar 11 on the shaft 4 serves to hold the shaft against endwise movement in its bearings.

The second cylinder whose printing surfaces are to be registered with their coacting printing surfaces on the plates 6 of the key cylinder, is denoted by 12, which second cylinder is removably secured between clamps 13 and 14 on the shaft 15, one end of which shaft is provided with a gear 16 of the same size as and in line with the gear 5 on the key cylinder shaft 4.

The ends of the second cylinder shaft 15 are shown as rotatively and removably mounted in open bearings 17 and 18 on the horizontal side members 9 and 10 of the frame, said open bearings serving to permit the ready insertion and removal of the cylinder 12, shaft 15 and gear 16.

An intermediate gear 19 is rotatively mounted in a bearing 20 on the horizontal side frame member 10, which intermediate gear meshes with both the gear 5 and the gear 16 when the cylinders are mounted in the frame. This operative connection between the two cylinder shafts will cause the cylinders to be rotated in unison in the same direction for bringing coacting printing surfaces on the two cylinders into position to be viewed by the means to be hereinafter described.

One completed circumferential row of printing plates 21 is shown as secured on the second cylinder 12 with their printing surfaces in longitudinal and circumferential register with the printing surfaces of the coacting plates 6 of the first circumferential row of plates on the key cylinder 1.

The top printing plate 21 of the next circumferential row of plates to be secured in register on the second cylinder 12 is shown as having its printing surface located in position to coact with the printing surface of the coacting top printing plate in the second circumferential row of plates on the key cylinder 1 for registry therewith. A collar 22 on the shaft 15 of the second cylinder 12 serves to hold the shaft against endwise movement in its bearings 17 and 18.

The housing for the mirror means is shown as comprising a body 23 and its removable top 24, the body 23 being open at its bottom. The top 24 is shown as open at its front end to form a window 25.

The mirror housing is shown as pivoted on the cylinder frame to swing into and out of its operative position over the cylinders 6 and 12. This mirror housing is also shown as mounted to move laterally on the cylinder frame to bring the housing to different selected positions along the key cylinder 1 and second cylinder 12, as follows. Crossbars 26 and 27 extend across the cylinder frame between the horizontal side members 9 and 10. Two vertical side bars 28 and 29 depend from the body 23 of the housing and are slidably pivoted at their lower ends on the frame crossbar 26. The vertical side bars 30 and 31 depend from the body 23 of the mirror housing at a distance to the front of the side bars 28 and 29 and these side bars rest upon the cylinder frame crossbar 27 when the housing is swung to its operative position.

A crossbar 32 which extends between and uprises from the back ends of the cylinder frame side members 9 and 10 serves as a stop for limiting the swinging movement of the mirror housing away from its operative position to its inoperative position. It will be seen that when this housing is swung to its inoperative position the cylinders, their shafts and gears may be readily removed from and inserted into the frame.

The mirrors located in the housing for reflecting coacting printing surfaces on the cylinders 1 and 12 to the window 25 of the housing for observation and correction of any misregister are shown as arranged as follows. A mirror 33 is located over the printing surface on the key cylinder 1 in position to reflect from its underside the image of said surface to the upper side of a mirror 34. This mirror 34 reflects the image through a transparent mirror 35 to the underside of a mirror 36, which mirror 36 reflects the image from the key cylinder 1 to the window 25. A mirror 37 which may be adjustably mounted in the sides of the housing is located over the coacting printing surface on the second cylinder 12 in position to reflect from its underside the image of said coacting surfaces to the upper side of the transparent mirror 35. This mirror 35 will reflect the image of the said coacting printing surface on the second cylinder 12 to the underside of the mirror 36. This mirror 36 therefore will reflect this image from the printing surface on the cylinder 12 in superimposed relationship on the image reflected from the printing surface on the key cylinder 1 to the said window 25 of the housing. This mirror 36 may be provided with crossed hair lines 36* for assisting in the accurate registering of the two printing surfaces. If there is any misregister of the said two printing surfaces it will be observed by the operator through the window 25, and the operator may then shift the plate 21 on the second cylinder 12 until its printing surfaces come into exact register with the coacting printing surfaces on the key cylinder 1. The plate 21 may then be permanently secured in its registered position to the cylinder 12.

To register the circumferentially next two coacting printing surfaces on the cylinders 1 and 12 the cylinders are rotated in unison through the connecting gears 5, 16 and 19 until the next printing surface on the key cylinder is properly positioned for reflection by the mirrors and the procedure above described is again used. A spring stop 37 carried by the side frame member 10 in normal toothed engagement with the gear 16 may be used for holding the two cylinders in their rotative adjustments.

To facilitate the registry of the coacting printing surfaces arranged in the next circumferential rows on the two cylinders, a bar scale 38 is located across the cylinder frame adjacent and parallel to the crossbar 27. A pointer 39 on the housing bar 30 is provided for coaction with said scale 38. The housing may be slid along the crossbars 26 and 27 to its proper position lengthwise of the cylinder for observing and correcting any misregister of the two coacting printing surfaces of the said next circumferential rows of plates on the said key and second cylinders.

It will be noted that after the full quota of printing surfaces on the second cylinder has been registered the housing may be swung to its nonoperative position and the key and second cylinders removed therefrom. If the printing surfaces on a third cylinder are to be registered with the printing surfaces on the key cylinder 1, the key cylinder is retained in the frame and the third cylinder inserted in place of the second cylinder. The housing is then swung to its operative position for registry of the printing surfaces on the two cylinders as above described.

The adjustment of the mirror 37, if necessary, may be accomplished by the provision of vertical elongated slots 40 in the sides of the housing body through which slots screw bolts 41 project from the mirror frame into position to be engaged by lock nuts 42.

If so desired the coacting printing surfaces on the two cylinders may be suitably illuminated to permit a better reflection of their images in superimposed relationship to the window 25. The means which I have shown for accomplishing this illumination comprises lamps 43 and 44 located in proper positions in the housing to illuminate the coacting printing surfaces on the two cylinders. A rheostat 45 and a hand switch 46 may be located in the lamp circuit 47.

While I have chosen to illustrate my invention as applied to the correction of any misregister of coacting printing plates for use in multicolor work I do not wish to be limited to such specific application but wish to include the register of printing surfaces of any character capable of being registered in my apparatus.

It is evident that various changes may be resorted to in the construction, form and arrangement of the several parts without departing from the spirit and scope of my invention, and hence I do not intend to be limited to the particular embodiment herein shown and described, but what I claim is:

1. In a machine for registering the printing surfaces of one cylinder with the coacting printing surfaces of another cylinder, a frame constructed to removably and rotatively mount the two cylinders in parallelism, a housing mounted on the frame, said housing having a window and mirrors arranged in the housing in position to reflect coacting printing surfaces on the two cylinders in superimposed relationship to the window for observation and correction of any misregister of said printing surfaces, said housing being movable across the frame lengthwise of the two cylinders to bring in superimposed relationship different longitudinally placed coacting printing surfaces on the two cylinders, two crossbars being provided on the frame parallel to the cylinders for slidably pivoting the housing on one crossbar and removably slidably mounting the housing on the other crossbar to permit the housing to be swung into and out of its operative position.

2. In a machine for registering the printing surfaces of one cylinder with the coacting printing surfaces of another cylinder, a frame constructed to removably and rotatively mount the two cylinders in parallelism, a housing mounted on the frame, said housing having a window and mirrors arranged in the housing in position to reflect coacting printing surfaces on the two cylinders in superimposed relationship to the window for observation and correction of any misregister of said printing surfaces, said housing being movable across the frame lengthwise of the two cylinders to bring in superimposed relationship different longitudinally placed coacting printing surfaces on the two cylinders, a scale and two crossbars carried by the frame parallel to the cylinders, and a marker on the housing coacting with said scale for accurately positioning the housing along the cylinders, said housing being slidably pivoted on one crossbar and removably slidable on the other crossbar to permit the housing to be swung into and out of its operative position.

3. In a machine for use in securing the printing plates on one printing cylinder with their printing surfaces in register with their coacting printing surfaces on the plates of a parallel key printing cylinder, a frame, bearing means arranged to cooperate with fixed elements of the two printing cylinders for readily inserting and removing and for rotatably mounting the two printing cylinders in the frame and mirror means located above the two printing cylinders for reflecting the printing surfaces of coacting plates on the two printing cylinders in superimposed relationship to a predetermined point for observation and correction by the operator of any misregister of said printing surfaces.

4. In a machine for use in securing the printing plates on one printing cylinder with their printing surfaces in register with their coacting printing surfaces on the plates of a parallel key printing cylinder, a frame, bearing means arranged to cooperate with fixed elements of the two printing cylinders for readily inserting and removing and for rotatably mounting the two printing cylinders in the frame, mirror means located above the two printing cylinders for reflecting the printing surfaces of coacting plates on the two printing cylinders in superimposed relationship to a predetermined point for observation and correction by the operator of any misregister of said printing surfaces, and means operatively connecting the two printing cylinders whereby they may be rotated in unison to bring into view different coacting printing surfaces arranged around the cylinders.

5. In a machine for use in securing the printing plates on one printing cylinder with their printing surfaces in register with their coacting printing surfaces on the plates of a parallel key printing cylinder, a frame, bearing means arranged to cooperate with fixed elements of the two printing cylinders for readily inserting and removing and for rotatably mounting the two printing cylinders in the frame, mirror means located above the two printing cylinders for reflecting the printing surfaces of coacting plates on the two printing cylinders in superimposed relationship to a predetermined point for observation and correction by the operator of any misregister of said printing surfaces, said mirror means being movable longitudinally of the cylinders to bring into view in superimposed relationship different coacting printing surfaces arranged lengthwise of the cylinders.

6. In a machine for use in securing the printing plates on one printing cylinder with their printing surfaces in register with their coacting printing surfaces on the plates of a parallel key printing cylinder, a frame, bearing means arranged to cooperate with fixed elements of the two printing cylinders for readily inserting and removing and for rotatably mounting the two printing cylinders in the frame, a mirror housing mounted on the frame above said printing cylinders, said housing having a window and mirrors arranged in the housing to reflect the images of the printing surfaces of coacting printing plates on the two printing cylinders in superimposed relationship to the window for observation and correction by the operator of any misregister of said printing surfaces.

7. In a machine for use in securing the printing plates on one printing cylinder with their printing surfaces in register with their coacting printing surfaces on the plates of a parallel key printing cylinder, a frame, bearing means arranged to cooperate with fixed elements of the two printing cylinders for readily inserting and removing and for rotatably mounting the two printing cylinders in the frame, a mirror housing mounted on the frame above said printing cylinders, said housing having a window and mirrors arranged in the housing to reflect the images of the printing surfaces of coacting printing plates on the two printing cylinders in superimposed relationship to the window for observation and correction by the operator of any misregister of said printing surfaces, said housing being movable across the frame lengthwise of the two printing cylinders to bring in superimposed relationship images of different longitudinally placed coacting printing surfaces on the two cylinders.

EARLE L. HARLEY.

REFERENCES CITED

The following references are of record in the file of this patent:

UNITED STATES PATENTS

| Number | Name | Date |
|---|---|---|
| 1,199,941 | Taylor | Oct. 3, 1916 |
| 1,690,143 | Taylor | Nov. 6, 1928 |
| 2,289,557 | Taylor | July 14, 1942 |
| 2,344,296 | Frink | Mar. 14, 1944 |